(12) United States Patent
Driver

(10) Patent No.: US 6,302,797 B1
(45) Date of Patent: Oct. 16, 2001

(54) FLEXIBLE DRILL PIPE

(76) Inventor: W. B. Driver, P. O. Box 1281, Greenville, TX (US) 75403

( * ) Notice: Subject to any disclaimer, the term of this patent is extended or adjusted under 35 U.S.C. 154(b) by 0 days.

(21) Appl. No.: 09/553,674

(22) Filed: Apr. 21, 2000

(51) Int. Cl.$^7$ ..................................................... F16D 17/02
(52) U.S. Cl. .............................. 464/19; 464/18; 464/149; 464/157; 464/183
(58) Field of Search ................................ 464/19, 18, 73, 464/149, 157, 183

(56) References Cited

U.S. PATENT DOCUMENTS

| | | | |
|---|---|---|---|
| 2,709,070 | * 5/1955 | Bielstein | 464/149 |
| 4,031,713 | * 6/1977 | Driver | 464/19 |
| 4,062,412 | * 12/1977 | McIlvanie | 175/57 |
| 4,149,391 | * 4/1979 | Driver | 464/19 |
| 4,233,820 | * 11/1980 | Driver | 464/19 |

* cited by examiner

*Primary Examiner*—Lynne H. Browne
*Assistant Examiner*—Aaron Dunwoody

(57) ABSTRACT

In the invention a flexible drill pipe comprising a plurality of short tube sections assembled end to end. Each short tube section having the same number and type of saw tooth shaped gear teeth cut around the circumference of each end of the short tube section. The orientation of the gear teeth on each end of the short tube section is such that the gear teeth of the short tube sections will intermesh when the short tube sections are assembled end to end. The plurality of short tube sections assembled end to end carries the torque load of the flexible drill pipe. A tool joint is interfaced on each of the plurality of short tube sections. The end of the tool joints that interfaces with the plurality of short tube sections has the same overall diameter and internal diameter and the same type and number of gear teeth as the short tube section. Wire rope lengths are assembled around and parallel to a hose used to carry drilling fluids through the flexible drill pipe. The wire rope lengths assembled around the hose extend through the plurality of short tube sections into and attaches to the tool joints. The wire rope assembly carries the tension loads on the flexible drill pipe. At selected intervals along the plurality of short tube sections, selected short tube sections are cemented or other wise attached to the part of the wire rope assembly they enclose.

1 Claim, 3 Drawing Sheets

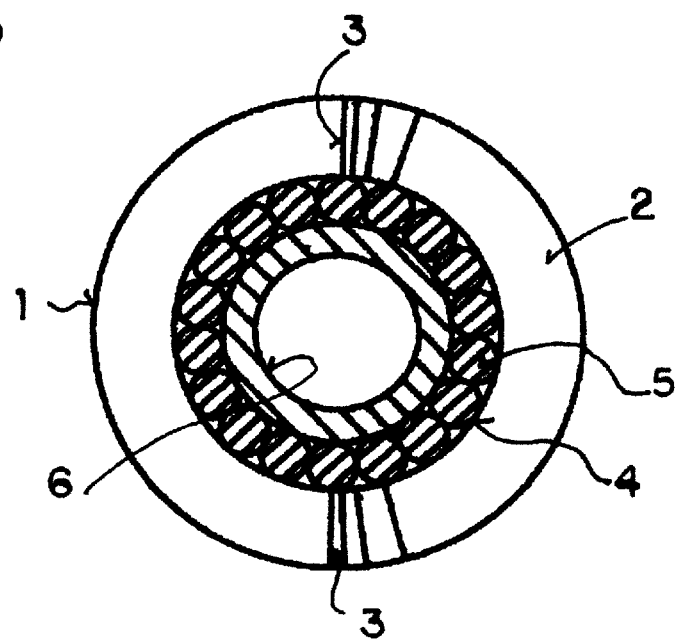
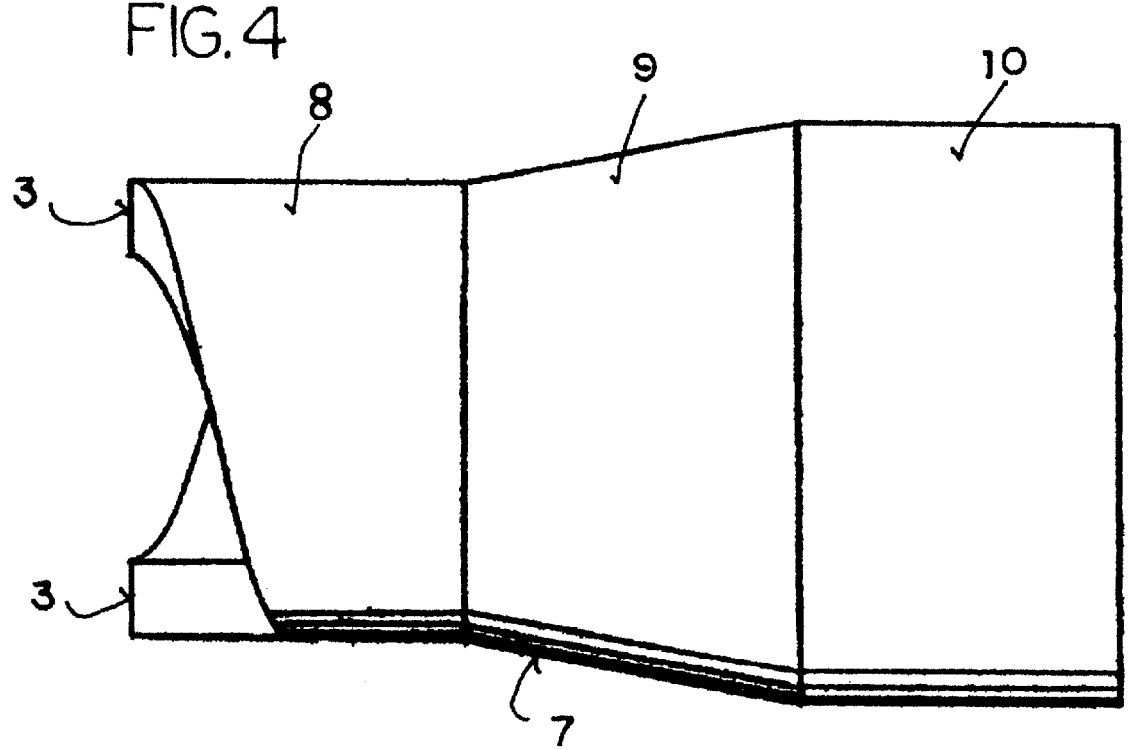

FLEXIBLE DRILL PIPE

CROSS-REFERENCE TO RELATED APPLICATIONS

There are no other applications that are related to this application.

BACKGROUND OF THE INVENTION

This invention is related to tools used to bore holes in the earth such as drill pipe, flexible drill pipe, flexible shafts, drill rods and shafts.

PAIOR ART

There has been great interest in increasing the production from oil and gas formations. One method for doing this is the drilling of horizontal drain holes in the oil or gas formations to increase the pore drainage. To be able to drill the horizontal drain holes requires drill pipe that can drill a radius from the vertical to the horizontal. The shorter the radius the more horizontal drain holes can be put at different levels in an oil or gas formation. Also the shorter the radius the more thin oil or gas formation can benefit from horizontal drain hole drilling.

SUMMARY OF THE INVENTION

An objective of the invention is to provide a flexible drill pipe, which can drill angled or curved holes in earth formations.

An objective of the invention is to provide a flexible drill pipe that can drill and operate from around ultra short radii from the vertical to the horizontal.

An objective of the invention is to provide a flexible drill pipe that can drill horizontal drain holes in earth formations from around ultra short radii from the vertical to the horizontal.

An object is to provide a flexible drill pipe with an outside covering of short tube sections with enter locking gear teeth assembled end to end over the length of the flexible drill pipe and carry the torque load required to operate a drill bit.

An object of the invention is to provide a means so the tube sections described above can operate and not let the interlocking gear teeth of the tube section separate.

DESCRIPTION OF THE DRAWINGS

In the accompanying drawing;

FIG. 3 is a cross section of the flexible drill pipe showing how the wire rope lengths are assembled around the hose that extends through the tube sections. For clarity only one wire rope length is numbered FIG. 4 shows a view of the tool joint of which one will be used on each end of the flexible drill pipe.

Figure 1:
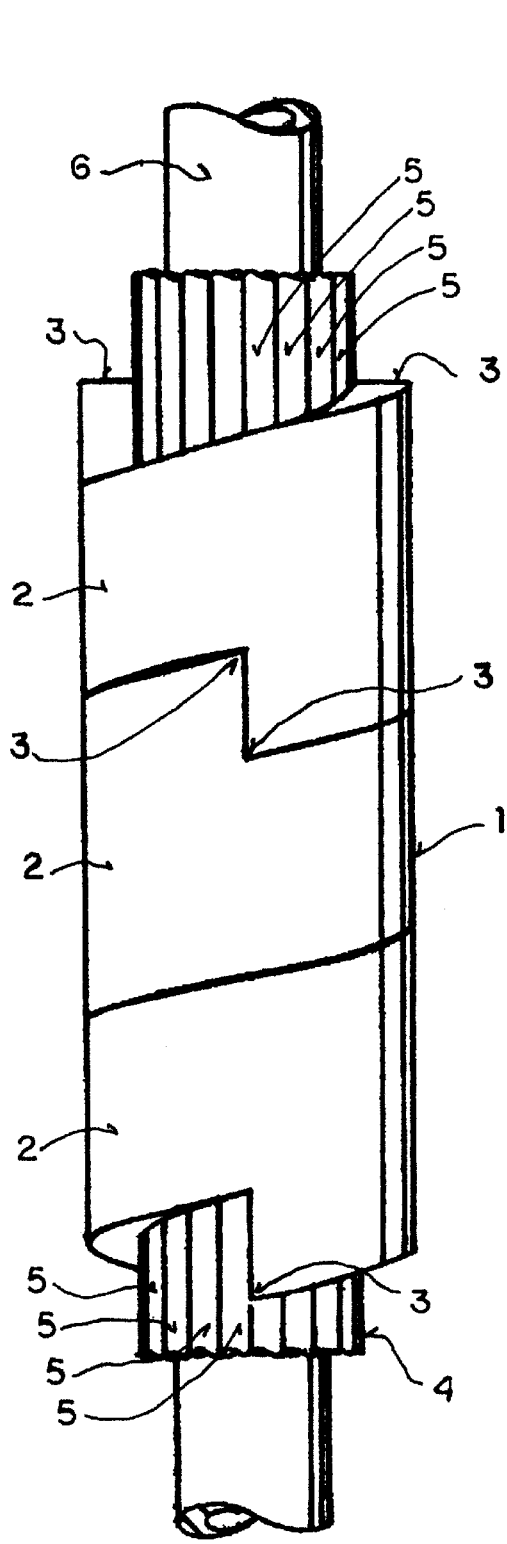
FIG. 1 is a parcel section of the flexible drill pipe showing the tube sections with their saw tooth gear teeth interfaced and enclosing the wire ropes assembly that is assembled around the hose.

REFERENCE NUMERALS IN DRAWINGS 1 flexible drill pipe
2 short tube sections
3 gear tooth
4 wire rope lengths assembly
5 wire rope length
6 hose
7 tool joint
8 tube section interface end
9 cone shape section
10 connection end
11 compression sleeve
12 braid
13 internal threads

DESCRIPTION OF THE PREFERRED EMBODIMENT

Figure 2:
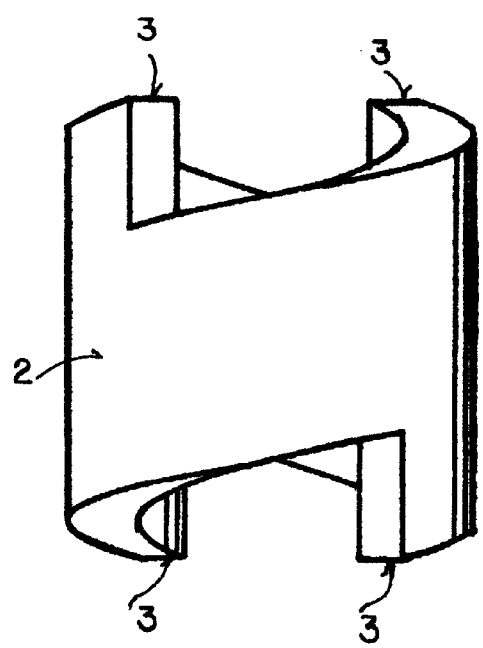
FIG. 2 illustrated is a tube section showing the gear teeth constructed around the circumference of each end of the tube section. It should be noted that the orientation of the gear teeth on one end of the tube section is opposite from the gear teeth on the other end of the tube section. The position of the gear teeth on one end of the short tube section is off set by ninety degrees around the circumference of the short tube section from the position of the gear teeth on the opposite end of the short tube section.

In FIG. 1 flexible drill pipe 1 comprises a plurality of short tube sections 2 assembled end to end with interlocking gear teeth 3. The gear teeth 3 are constructed around the circumference of each end of the short tube sections 2. See FIG. 2 The gear teeth 3 is on each end of the short tube section 2. The orientation of the gear teeth 3 around the circumference of one end of the short tube section 2 is opposite to the orientation of the gear teeth 3 as described is required so the gear teeth 3 can fit together when the short tube sections 2 are assembled end to end to form the outside of the flexible drill pipe 1. The gear teeth 3 are a saw shape gear teeth where one side of the gear teeth 3 is parallel with the axle center of the short tube section 2 and the other side is at an angle to the axle center of the short tube section 2.

A plurality of wire rope lengths 5 are formed to into a wire rope lengths assembly 4 around hose 6 and are laid through the plurality of short tube sections 2. See FIG. 1 and FIG. 3. The wire rope lengths 5 are laid parallel to the axle center of the hose 6 and plurality of short tube sections 2. The internal diameter of the short tube sections 2 is approximately the diameter of the wire rope lengths assembly 4 around hose 6 or slightly larger. The short tube sections 2 will carry the torque loads of the flexible drill pipe 1 and the wire rope lengths assembly 4 will carry the tension loads on the flexible drill pipe 1. The hose 6 will provide a means for drilling fluids to be pumped through the flexible drill pipe 1 when in operation.

The short tube sections 2 will be assembled with a loose fit. How loose this fit will be determined on flexibility required for the flexible drill pipe 1. The problem with the loose fit of the short tube section 1 interface is over a flexible drill pipe 1 of meaningful length the looseness can accumulate to where there would be separation of the gear teeth 3 at a short tube section 1 interface. To keep this separation of gear teeth 3 at an short tube section 2 interface from occurring at selected intervals along the plurality of assembled short tube sections 2 a selected short tube section 2 would be cemented or other wise attached to the wire rope lengths assembly 4. The selected short tube sections 2 would be determined at intervals where the looseness of the short tube section 2 interface could not accumulate to cause the gear teeth 3 separation.

Figure 5:
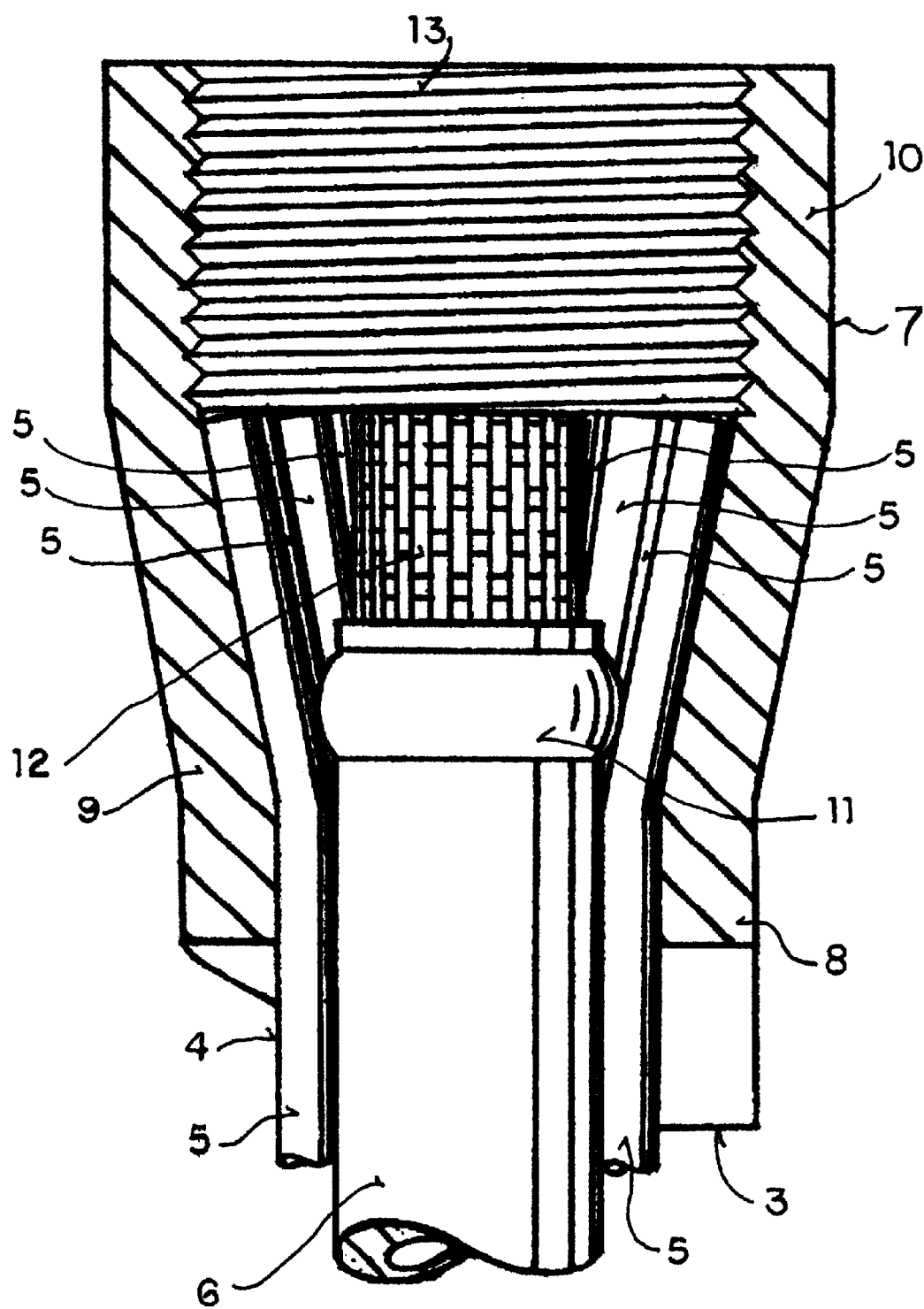
FIG. 5 shows an axle cross section and how the wire rope lengths assembly and hose extend into the tool joint.

A tool joint 7, see FIG. 4 and FIG. 5, is attached to each end of the flexible drill pipe 1 so the flexible drill pipe 1 can be connected to drill bits or other tooling. Tube interface end 8 of tool joint 7 has the same outside diameter, internal diameter and number of gear teeth 3 as short tube section 2. The connection end 10 of tool joint 7 has internal threads 13 so the tool joint 7 can connect the flexible drill pipe 1 to drill bits or other tooling. The connection end 10 of tool joint 7 has outside and internal diameter larger than tube interface end 8 of tool joint 7.

The cone shaped section 9 of tool joint 7 is where the outside diameter and internal diameter of the tool joint 7 expands from the outside diameter and internal diameter of the tube interface end 8 of tool joint 7 to the connection end 10 of tool joint 7.

The wire rope lengths assembly 4 and hose 6 are long enough to extend throught the plurality of short tube sections 2 assembled end to end and into the tool joints 7 on each end of the plurality of short tube sections 2. The wire rope lengths assembly 4 and hose 6 extend into tool joints 7 on each end of the plurality of short tube sections 2 through the tube interface end 8 to near the internal threads 13 of connection end 10. See FIG. 5.

A compression sleeve 11 is slipped over the end of hose 6 forcing the end portions of the wire rope lengths 5 against the internal wall of the cone shaped section 9 of tool joint 7. The outside covering of hose 6 from its ends to near the compression sleeve 11 is removed exposing the braid 12 of hose 6. A filler epoxy cement is poured around the braid 12 and the end portions of wire rope lengths 5 that will harden and adhere to braid 12, end portions of wire rope lengths 5 and the internal wall of cone shaped section 9 of tool joint 7.

What is claimed is:

1. A flexible drill pipe comprising a plurality of short tube sections assembled end to end, each short tube section having two or more gear teeth cut around the circumference of each end of said short tube sections and equally space, said gear teeth being saw tooth shaped where one side is parallel to the axle center of said short tube section and the other side being at an angle to the axle of said short tube section, each end of said short tube section having the same number of said gear teeth, the orientation of said gear teeth around the circumference of one end of said short tube section is opposite to the orientation of said gear teeth around the circumference of the other end of said short tube section, so said gear teeth can interlock when said short tube sections are assembled end to end, the position of said gear teeth on one end of said short tube section to the position of said gear teeth on the opposite end of said short tube section around the circumference of said short tube section can be the same or off set, a wire rope length, an assembly of said wire rope lengths, a hose, said wire rope lengths assembly being assembled around said hose where said wire rope lengths are parallel to the axle center of said hose, said wire rope assembly and said hose extends through said plurality of said short tube sections, the internal diameter of said short tube sections is approximately the same or slightly larger than the overall diameter of the said wire rope assembly around the said hose, at selected intervals along the said plurality of assembled short tube sections a selected short tube section is cemented or other wise attached to the part of the said wire rope lengths assembly that the selected short tube section encloses, a tool joint, one said tool joint interfaced with each end of said plurality of said short tube sections, the short tube section interface end of said tool joint having the same overall diameter, internal diameter and the same number and type of said gear teeth as the said short tube sections, the connection end of said tool joint opposite the said tube section interface end has larger overall diameter and internal diameter and has internal threads, a cone shaped section of said tool joint is where said tool joint overall diameter and internal diameter expands from the overall diameter and internal diameter of the tube section interface end to the connection end of said tool joint, said wire rope lengths assembly and said hose being long enough to extend through the plurality of said short tube sections and into the said tool joint on each end of said plurality of said short tube sections, the end of said wire rope lengths assembly and said hose extends through said tube section interface end of said tool joint to near the internal threads of the connection end of said tool joint, a compression sleeve, said compression sleeve slips over the end of said hose forcing the end portions of said wire rope lengths against the internal wall of the said cone section of said tool joint, the outside covering of said hose from the end of said hose near the said internal threads to near the compression sleeve is removed exposing the braid of said hose, a filler epoxy cement is poured around the said braid of said hose and said end portions of said wire rope lengths and when harden adhere to said braid, said end portions of said wire rope lengths and the inside wall of said cone section of said tool joint attaching the end portion of said wire rope assembly and said hose to the inside of said tool joint.

\* \* \* \* \*